United States Patent

[11] 3,603,719

| [72] | Inventor | Daniel Lejeune<br>Clermont-Ferrand, France |
|---|---|---|
| [21] | Appl. No. | 865,861 |
| [22] | Filed | Oct. 13, 1969 |
| [45] | Patented | Sept. 7, 1971 |
| [73] | Assignee | Compagnie Generale des Establissements<br>Michelin raison sociale Michelin & Cie<br>Clermont-Ferrand, France |
| [32] | Priority | Oct. 23, 1968 |
| [33] | | France |
| [31] | | 171,116 |

[54] FLEXIBLE TUBES HAVING INNER SHEATH SERVING AS MANDREL FOR OUTER SHEATH AND METHOD OF MAKING SAME
11 Claims, 3 Drawing Figs.

[52] U.S. Cl. ................................................. 174/47,
138/127, 138/130, 138/138, 156/143, 156/149
[51] Int. Cl. ..................................................... F16l 11/08,
F16l 11/12, B29d 23/00
[50] Field of Search ......................................... 174/47, 68,
68 C, 70; 340/320; 138/103, 118, 123, 124, 125,
126, 127, 129, 130, 132, 133, 137, 138, 139, 172,
174; 156/143, 149, 169, 172

[56] References Cited
UNITED STATES PATENTS

| 301,417 | 7/1884 | Wilkinson ................... | 174/47 |
| 798,137 | 8/1905 | Magowan ..................... | 138/127 |
| 2,730,133 | 1/1956 | Holland-Bowyer et al. ... | 138/127 |
| 3,123,102 | 3/1964 | Frieder et al. ................ | 138/125 |
| 3,234,723 | 2/1966 | Brown .......................... | 174/47 UX |
| 3,481,368 | 12/1969 | Vansickle et al. ............ | 138/125 |
| 3,500,867 | 3/1970 | Elson ........................... | 138/125 |

FOREIGN PATENTS

| 735,258 | 5/1966 | Canada ......................... | 174/47 |
| 923,816 | 4/1963 | Great Britain ................ | 174/47 |
| 957,039 | 5/1964 | Great Britain ................ | 174/47 |

Primary Examiner—Laramie E. Askin
Attorney—Brumbaugh, Graves, Donohue & Raymond

ABSTRACT: A flexible tube is formed with an outer sheath comprising reinforcing steel cords helically wound and distributed in an even number of layers and an inner sheath comprising a reinforcing braid of steel wires, the wires being in spaced-apart relation to each other. The inner sheath resists crushing and twisting and serves as a mandrel for the manufacture of the outer sheath.

PATENTED SEP 7 1971 3,603,719
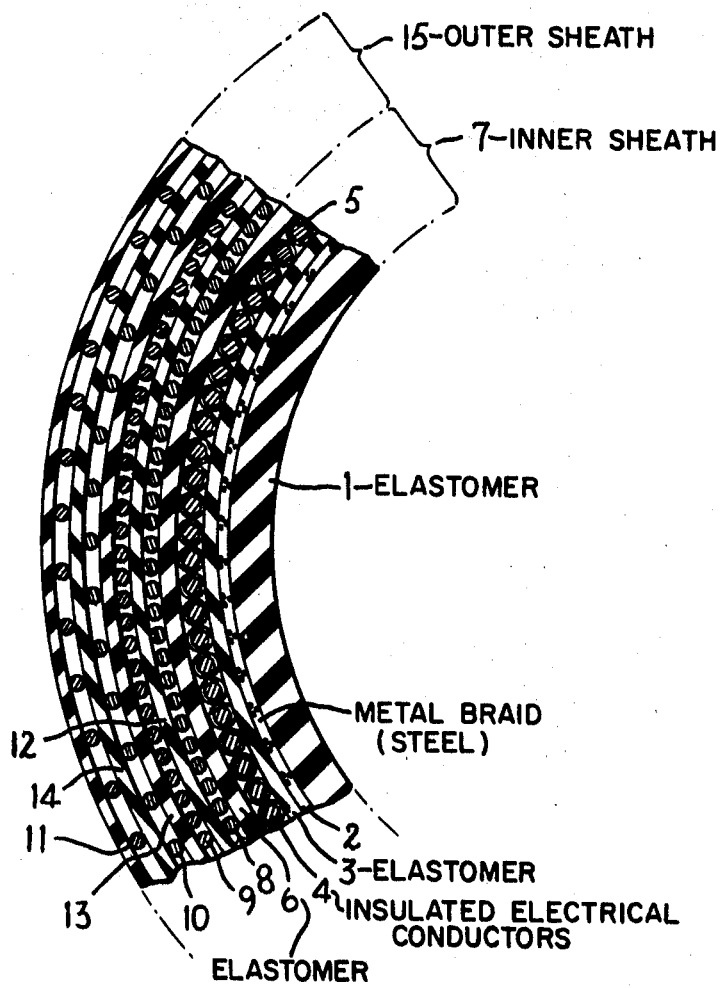
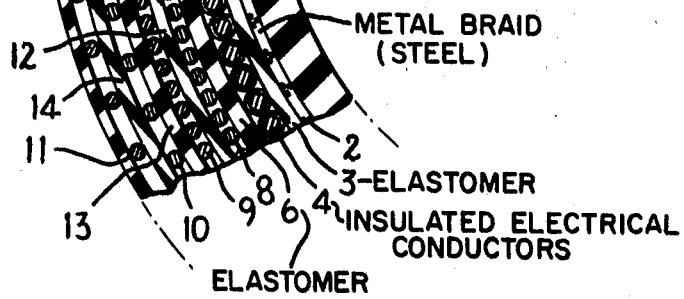
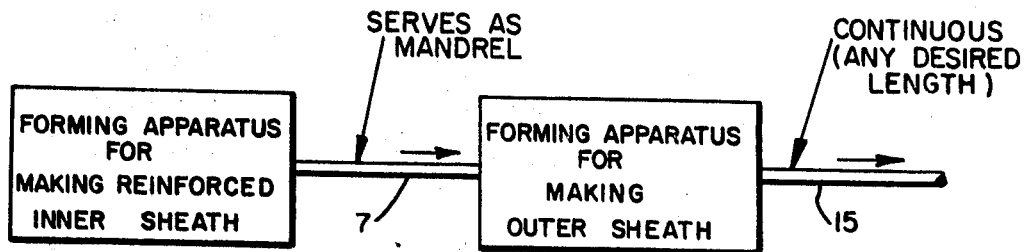
INVENTOR.
DANIEL LEJEUNE
BY
Brumbaugh, Graves, Donohue & Raymond
his ATTORNEYS

FLEXIBLE TUBES HAVING INNER SHEATH SERVING AS MANDREL FOR OUTER SHEATH AND METHOD OF MAKING SAME

BACKGROUND OF THE INVENTION

The present invention relates to flexible tubes and, more particularly, to flexible rubber tubes that are reinforced, especially those that are reinforced by metal wires.

A tube made of reinforced rubber, consisting for example of superimposed layers of rubber and plies of textile or metal fibers, is conventionally manufactured on a mandrel, which is a rigid support in the form of a tube or rod. The manufacture is effected by extruding and placing the various elements constituting the tube on the mandrel. Following vulcanization, the mandrel is removed. In this process, the length of the tube is by necessity limited. While mandrels of 10, 20 and even 50 meters may be used, it is practically impossible to go beyond that, and it is inconceivable that by the customary techniques a reinforced rubber tube in lengths of 500 or 1000 meters can be produced. The only means to obtain such lengths is the connection end-to-end of lengths of 20 meters, for example. However, such connections are difficult to make accurately in the case where the tube includes elements, imbedded in the tube rubber, for example, such as single-wire electric conductors or multiwire electric conductors. The connections also present difficulties if continuity of the shielding is desired without change in the inner or outer tube diameter at the connections.

SUMMARY OF THE INVENTION

An object of the invention is to remedy the deficiencies of conventional flexible tubes noted above. In particular, an object of the invention is to provide a new structure for flexible tubing, especially shielded or reinforced flexible tubing, which facilitates its manufacture in great lengths, and to provide an efficient method of manufacture of such tubing.

The foregoing and other objects are attained in accordance with the invention by the provision of flexible tubing comprising, in addition to an outer sheath, which can be reinforced, a flexible inner sheath resistant to crushing, to twisting and to pressure, the inner sheath serving an as assembly mandrel that is incorporated permanently into the tube.

The inner sheath may comprise a tubular metal braid made of single comparatively rigid cords or wires with a large mesh, or it may also comprise a layer of tubes, wires or cords of metal or any other material, arranged contiguously in the form of helices so as to form a cylindrical surface, or structure having a cylindrical surface and a resistance to crushing and twisting. The inner sheath preferably comprises several superimposed coaxial elements of any kind which reinforce mutually.

The inner sheath provided for the purpose of preparation of the pipe, or any of the elements included in the inner sheath, may be given an additional function. Thus, it may contribute to the mechanical resistance of the tube. It may comprise insulated wires made of a metal which is a good conductor of electricity and forming one or more electric lines for the flow of current, whereby electrical machinery can be actuated or signals transmitted. The inner sheath may comprise conduits facilitating the circulation of a fluid different from the fluid transported in the principal conduit. The inner sheath may furthermore serve simultaneously for circulation of fluids and of electricity and for reinforcement of the tube. Specifically, the inner sheath may facilitate electric, pneumatic or hydraulic regulation or the transportation of energy, for example, electrical energy.

The method of manufacture of flexible tubes in accordance with the invention comprises the continuous manufacture of the inner sheath, the use of such sheath as a mandrel in order to fabricate the outer sheath, and the permanent incorporation of the inner sheath in the tube. The inner sheath must resist crushing and twisting as well as the stresses exerted by the rolling of the tube when the tube elastomers are still in crude condition. Furthermore, the inner sheath is designed so as to be used in the tube in service.

BRIEF DESCRIPTION OF THE DRAWING

An understanding of additional aspects of the invention may be gained from a consideration of the following detailed description of the preferred embodiments thereof, wherein:

FIG. 1 is a fragmentary cross section of a tube in accordance with the invention;

FIG. 2 is a view in cross section showing a modification of a portion of the tube of FIG. 1, drawn on a larger scale; and FIG. 3 is a schematic view showing the method of the invention.

DESCRIPTION OF THE PREFERRED EMBODIMENT

FIG. 1 shows an inner lining 1 comprising a suitable elastomer, for example, natural rubber, neoprene or a rubber of the acrylic butadiene-nitrile kind, selected with regard to the nature and temperature, etc., of the fluid to be transported. Such a lining can be formed continuously by means of an extrusion machine.

On the lining 1 is arranged a metal braid 2 comprising, for example, 24, 36 or 48 groups of one to three wires of 0.18, 0.23 or 0.30 mm. diameter consisting of steel having a breaking strength of 300 kg./mm.$^2$. Such a braid has, for example, a diameter of approximately 7 cm. and comprises 144 wires of 0.30 mm. diameter distributed over its perimeter, thereby possessing sufficient rigidity so as not to be crushed easily as well as such flexibility as permits its being coiled on a drum of approximately 1 meter diameter. The braid 2 is formed by a braiding machine over the lining 1 as the lining leaves the extruder. The braiding machine works at the same speed as the extruder.

It is preferred that the angle formed by the wires and the axis of the pipe exceed 55° and be close to 60°. Over the braid 2 is placed an elastomeric band which forms a coat 3 adhering to the lining 1 through the meshes of the braid. The elastomer forming the coat 3 preferably has good adhesion to the metal wires of the braid 2 as well as to the elastomer constituting the lining 1.

On the coat 3 is placed a layer of cables, tubes or other strandular material such as copper wires 4 with circular cross sections and covered by an insulating material 5. These wires are contiguous and are rolled helically around the elements 1 to 3, forming an angle with the axis of the pipe which preferably is close to 60° and in all events exceeds 55°. Another rubber layer 6, formed by winding of an elastomeric strip, completes the inner sheath. The total of the elements 1 to 6 forms the inner sheath aggregate 7 which, because of the braid 2 and the closely placed wires 4, has sufficient rigidity to prevent crushing without preventing its being coiled, and has sufficient resistance to twisting so as to permit the placement of the working armor. If instead of one or more of the wires 4 one employs one or more tubes or conduits 4', as illustrated in FIG. 2, one or more fluids can be transported along the length of the flexible tube in addition to the fluid transported in the main bore of the flexible tube.

As FIG. 3 shows, the inner sheath 7 serves as a mandrel for placement of the reinforcing plies and the outer finish of the tube. As may be seen from FIG. 1, the outer sheath 15 of the tube comprises four piles of metal wires, 8, 9, 10 and 11, which are separated by rubber layers 12, 13 and 14. Each of the plies can be applied to the inner sheath 7 by a lap drawing frame, using pressure without any risk of crushing or twisting of the inner sheath, just as though the inner sheath were a conventional rigid mandrel. Each ply may comprise contiguous cords or cables consisting of a cord of three wires surrounded by one layer of nine wires, thereafter a second layer of 15 wires, all with a diameter of 0.23 mm., whereby the cable has a breaking resistance of 300 kg. The density and the structure of the cables as well as the number of steel cable layers may be chosen in accordance with the resistance the tube is to have.

The cables form helices in a conventional manner, winding in opposite directions from ply to ply (i.e., in Z direction in one ply and in S direction in an adjacent ply). The angle of laying, i.e., the angle formed by the cable with the axis of the tube, averages 55°, and the angle increases progressively from the first to the last ply, from 50° (first ply) to 60° (last ply).

In has been possible to prepare in this manner a flexible tube, capable of withstanding a load of approximately 50 tons, exceeding 1000 meters in length, having an outer diameter of 10 cm. and an inner diameter of 6 cm., the copper wires 4 of the tube being capable of carrying 100 kw. three-phase electric power. This flexible tube was adapted for oil drilling, in accordance with the technique described in French Pat. No. 1,411,125.

Thus there is provided in accordance with the invention a flexible tube having very high mechanical resistance to both longitudinal and radial extension and crushing, yet having sufficient flexibility to permit winding or coiling of the tube. The tube can be made in great lengths, thus eliminating the need to connect short lengths in order to obtain a tube of the desired length. Many modifications within the spirit and scope of the invention of the representative embodiment disclosed herein will readily occur to those skilled in the art and the invention is to be construed to include all of the embodiments thereof within the scope of the appended claims.

I claim:

1. A flexible tube comprising an outer sheath and an inner sheath, said outer and inner sheaths being coaxial and integrally joined to each other, said outer sheath comprising reinforcing steel cords helically wound and distributed in an even number of layers, said inner sheath comprising a reinforcing braid of steel wires, said wires being in spaced-apart relation to each other, and said inner sheath having an inner surface defining a main conduit and being resistant to crushing and to twisting but adapted for coiling.

2. A flexible tube in accordance with claim 1 wherein said inner sheath comprises a layer of strandular material arranged in contiguous helices.

3. A flexible tube in accordance with claim 2 wherein said strandular material is in the form of cables.

4. A flexible tube in accordance with claim 2 wherein said strandular material is in the form of wires.

5. A flexible tube in accordance with claim 2 wherein said strandular material is in the form of tubes.

6. A flexible tube in accordance with claim 2 wherein said strandular material is metallic.

7. A flexible tube in accordance with claim 1 wherein said inner sheath comprises electrical conductors for transmitting an electrical current along the length of said tube.

8. A flexible tube in accordance with claim 1 wherein said inner sheath comprises at least one conduit in addition to said main conduit for transporting fluid along the length of said tube.

9. A method of manufacturing a flexible tube, comprising the steps of forming an inner sheath, simultaneously reinforcing said inner sheath by forming therein a braid of steel wires, said wires being in spaced-apart relation to each other, so that said inner sheath resists crushing and twisting but remains adapted for coiling, forming an elastomeric outer sheath, said inner sheath serving as a mandrel during forming of said outer sheath, and integrally joining said outer and inner sheaths to each other.

10. A method according to claim 9 comprising the step of reinforcing said outer sheath with an even number of layers of helically wound steel cords so that said outer sheath resists crushing and twisting but remains adapted for coiling.

11. A method according to claim 9 wherein said tube is manufactured in continuous lengths of at least 500 meters.